United States Patent
Colombo et al.

(10) Patent No.: US 7,492,563 B2
(45) Date of Patent: Feb. 17, 2009

(54) LOW-VOLTAGE CIRCUIT BREAKER COMPRISING AN INTERFACE UNIT

(75) Inventors: Severino Colombo, Dalmine (IT); Federico Gamba, Bergamo (IT)

(73) Assignee: ABB S.p.A., Milan (IT)

( * ) Notice: Subject to any disclaimer, the term of this patent is extended or adjusted under 35 U.S.C. 154(b) by 225 days.

(21) Appl. No.: 10/543,300

(22) PCT Filed: Dec. 30, 2003

(86) PCT No.: PCT/IB03/06436

§ 371 (c)(1),
(2), (4) Date: Jul. 26, 2005

(87) PCT Pub. No.: WO2004/068669

PCT Pub. Date: Aug. 12, 2004

(65) Prior Publication Data

US 2006/0193096 A1 Aug. 31, 2006

(30) Foreign Application Priority Data

Jan. 28, 2003 (IT) .............................. BG03A0005

(51) Int. Cl.
*H01H 73/00* (2006.01)

(52) U.S. Cl. ..................................................... 361/115
(58) Field of Classification Search .................. 361/115
See application file for complete search history.

(56) References Cited

U.S. PATENT DOCUMENTS

| 4,833,563 | A | * | 5/1989 | Russell ......................... 361/92 |
| 5,600,527 | A | * | 2/1997 | Engel et al. ................. 361/93.2 |
| 6,005,757 | A | * | 12/1999 | Shvach et al. ................. 361/64 |
| 6,239,960 | B1 | * | 5/2001 | Martin ......................... 361/86 |
| 6,246,928 | B1 | | 6/2001 | Louis et al. |
| 2003/0100980 | A1 | * | 5/2003 | Gruenewald et al. .......... 701/36 |

* cited by examiner

*Primary Examiner*—Michael J Sherry
*Assistant Examiner*—Christopher J Clark
(74) *Attorney, Agent, or Firm*—Connolly Bove Lodge & Hutz LLP; Myron Keith Wyche

(57) ABSTRACT

A low-voltage circuit breaker comprising a casing containing at least one fixed contact and at least one mobile contact. The circuit breaker moreover comprises, inside said casing, a first communication bus, designed to interface a plurality of accessories and devices of said circuit breaker, and an interface unit, which comprises a plurality of ports that are designed to be connected to said accessories and devices via said first communication bus.

11 Claims, 1 Drawing Sheet

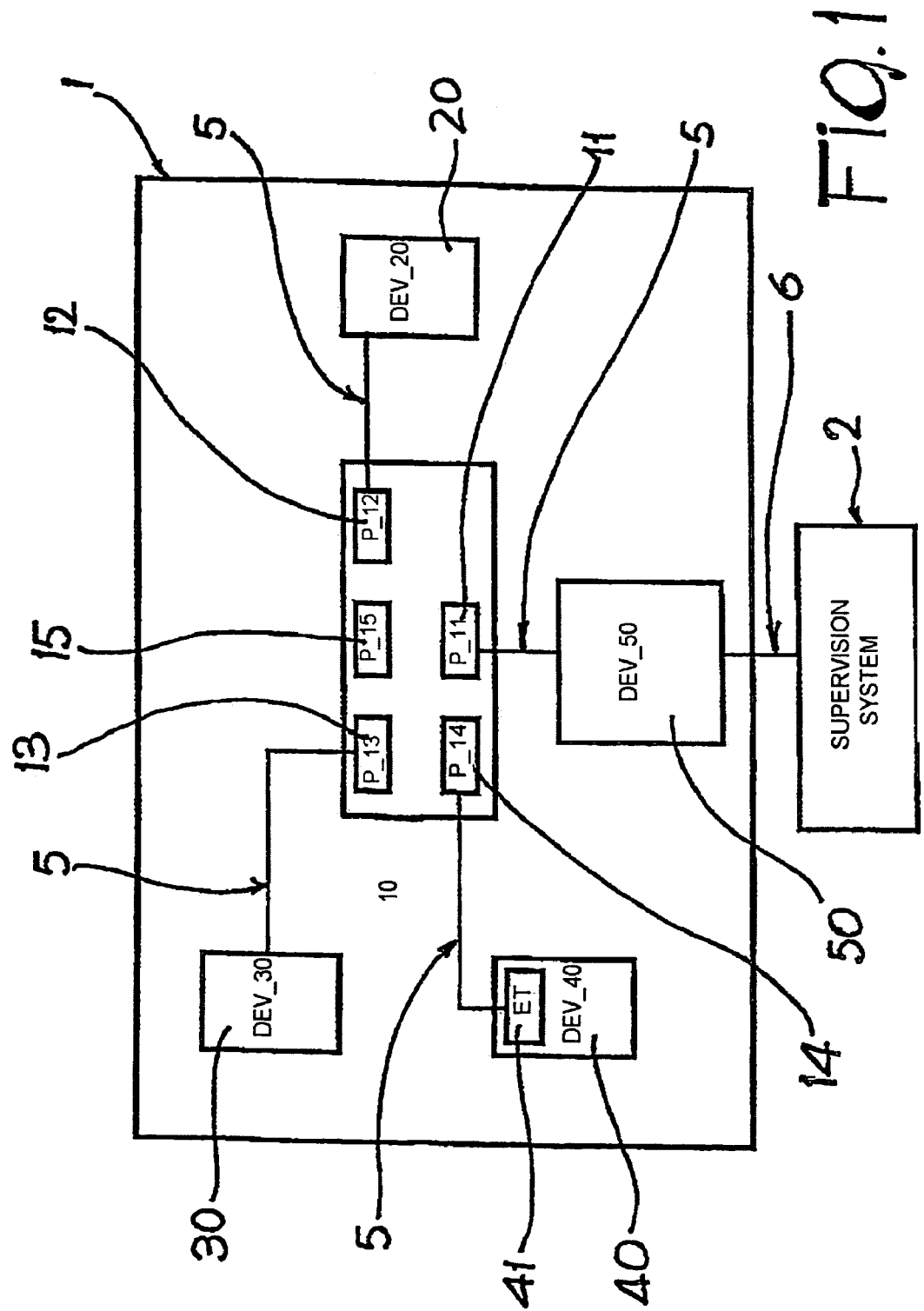

LOW-VOLTAGE CIRCUIT BREAKER COMPRISING AN INTERFACE UNIT

FIELD OF THE INVENTION

The present invention relates to a low-voltage circuit breaker comprising an interface unit inside the circuit breaker itself, and in particular to a low-voltage circuit breaker comprising an interface unit, for example for communication and/or management and/or supply, for accessories, actuators, warning devices and similar devices, of said circuit breaker.

BACKGROUND INFORMATION

As is known, low-voltage circuit breakers (i.e., ones for applications with working voltages of up to 1000 V) are devices designed for the purpose of protecting correct functioning of specific parts of the electrical system in which they are inserted and of the loads corresponding to said electrical system. For example, they ensure the rated current required for the different loads, enable a correct insertion of the loads into, and detachment thereof from, the circuit and enable automatic breaking of the protected circuit via galvanic separation or opening of appropriate contacts in order to obtain total isolation of the load from the source of electrical energy in the event of faulty operation of a specific branch of the system. The device that enables the circuit breaker to recognize automatically the states of faulty operation and to intervene accordingly with opening of the circuit is referred to as protection unit.

The aforesaid automatic low-voltage circuit breakers exist in different types, such as, for example, the so-called moulded-case circuit breakers (MCCBs), and the so-called air circuit breakers (ACBs).

Automatic circuit breakers can normally be equipped with a wide range of additional accessories. Amongst the accessories with which a normal circuit breaker can be equipped, it is possible to mention, for instance, auxiliary contacts for signalling of state (which may be open, closed, or tripped), servo-actuators for opening, closing, and resetting (solenoid controls or motor controls, devices for loading springs), undervoltage relays, temperature sensors, and other similar devices, which, as will be seen, fall within the scope of the present invention.

One of the limits of the above circuit breakers of a known type is represented by the fact that the various accessories are managed and wired independently of one another. To be exact, in the known solutions, each of the accessories mounted in the automatic circuit breaker is equipped with a bus of its own, designed for the various functions of supply, control, or transmission of the signals corresponding thereto.

Clearly, in the above conditions, the circuit breaker is traversed in various ways by auxiliary cables of different types, which, from one case to another, may remain within the overall volume of the circuit breaker, or else terminate on the outside thereof, so as to give rise to the necessary operative connections with other parts of the system, such as for example external displays, push-buttons and electronic control units, interlocking systems, dialogue units or supervision units.

As is known, in an electrical system the presence of numerous auxiliary cables is always far from appreciated, for example because it subjects the system to greater risks of error in the steps of wiring and maintenance. Furthermore, all the auxiliary conductors must be technically adequate from the electrical, mechanical and thermal standpoints, and from the standpoint of electromagnetic compatibility. In addition, they must be readily identifiable, and this obviously entails a high general complexity of the system that inevitably implies heavy burdens.

In particular, in a normal wiring situation it is possible to find simultaneously different buses corresponding to the different accessories installed, such as for example for the actuator, the auxiliary contacts, the thermal sensors, and the warning units, and each of these is called upon to carry, independently and according to its own protocol, signal flows that may be variously used and treated both inside and outside the circuit breaker.

Another drawback linked to the excessive presence of auxiliary buses or cables consists in the need to guarantee for each of them an adequate protection from undesirable mechanical or thermal actions that may arise in time as a result of other components present inside the automatic circuit breaker or the electrical switchboard that houses it. The very presence of cables entails, in any case, the need to activate adequate maintenance cycles, the costs of which of course increase according to the complexity of the system.

The wiring methods of the known art moreover exploit important physical areas both within the circuit breaker and on the electrical switchboard that houses it, in contrast with the wiring principle of optimization and economy of space.

It is evident from what has been described above that there exists in the state of the art the need to have technical solutions that will represent a valid alternative to the known methods and devices of management and dialogue for accessories, warning displays and protection units for automatic circuit breakers, as well as devices for dialogue with an external supervising unit.

SUMMARY OF THE INVENTION

The primary task of the present invention is to provide a low-voltage circuit breaker that will enable the drawbacks cited previously to be overcome, simplifying communication between the various devices and accessories and facilitating their management.

Within the framework of this task, one of the purposes of the present invention is to provide a low-voltage circuit breaker in which there will be prevented the problems of excessive wiring and connections, typical of the circuit breakers of the known art.

Yet a further purpose of the present invention is to provide a low-voltage circuit breaker which, as compared to the systems of a known type, will enable complete elimination, or at least significant reduction, of any risks linked to the possibility of erroneous connection of the wiring.

Another purpose of the present invention is to provide a low-voltage circuit breaker that will enable facilitation of the installation of accessories and devices inside said circuit breaker.

A further purpose of the present invention is to provide a low-voltage circuit breaker in which communication between the various devices and accessories of the circuit breaker and between the circuit breaker itself and other units external thereto will be simplified and rationalized.

Yet a further purpose of the present invention is to provide a low-voltage circuit breaker, in which the various accessories and the corresponding communication systems will form a system integrated with the circuit breaker itself.

Another purpose of the present invention is to provide a low-voltage circuit breaker in which it is possible to install a wide range of accessories and devices, always in an intuitive and practical way, at contained costs, and with high reliability.

Not the least important purpose of the present invention is to provide a low-voltage circuit breaker that will present high reliability, relatively easy construction, and competitive costs.

The above primary task and the above purposes, as well as others that will appear more clearly from what follows are achieved by a low-voltage circuit breaker that comprises a casing containing at least one fixed contact and one mobile contact. The low-voltage circuit breaker according to the invention is characterized in that it comprises, inside said casing, a first communication bus that is designed to interface a plurality of accessories and devices of said circuit breaker. The circuit breaker according to the invention moreover comprises an interface unit that includes a plurality of ports, which are designed to be connected to said accessories and devices via said first communication bus.

In this way, thanks to its innovative structure, the circuit breaker according to the invention renders possible dialogue between the different devices and accessories of the circuit breaker and between them and the external environment in a simplified way and without resorting to complicated wiring systems.

BRIEF DESCRIPTION OF THE DRAWINGS

Further characteristics and advantages will emerge more clearly from the description of preferred but non-exclusive embodiments of a low-voltage circuit breaker according to the invention, illustrated by way of indicative and non-limiting example, with the aid of the attached drawings, in which:

FIG. 1 is a schematic representation of the circuit breaker according to the invention. The low-voltage circuit breaker according to the invention will be described with reference to an automatic low-voltage circuit breaker, without thereby wishing in any way to limit its range of application, given that the invention is applicable to low-voltage circuit breakers in general. With reference to FIG. 1, the low-voltage circuit breaker according to the invention is designated as a whole by the reference number 1. In its more general practical embodiment, the circuit breaker according to the invention comprises a casing that houses, within it, at least one fixed contact and at least one mobile contact (not illustrated in the FIGURE). Inside the casing, the circuit breaker comprises a first communication bus 5, which is designed to interface one or more accessories and devices (DEV_XX), where XX is one of 20, 30, 40, 50 of said circuit breaker. Again, located inside the casing is an interface unit 10, which comprises a plurality of ports (P_YY), where YY is one of 11, 12, 13, 14, 15, which are designed to be connected to the aforesaid accessories and devices (DEV_XX), where XX is one of 20, 30, 40, 50 by means of said first communication bus 5. In practice, the interface unit 10 is pre-arranged to receive connection with the various accessories and devices according to the so-called principle of "plug and play", simplifying and facilitating both their installation and communication between them and with the external environment.

DETAILED DESCRIIPTION OF THE INVENTION

According to a preferred embodiment of the circuit breaker according to the invention, one of said accessories and devices is constituted by a protection unit 50, and the interface unit 10 envisages a first connection port 11 and at least one second connection port 12. The protection unit 50 is thus connected, via the first communication bus, to the first port 11 of the interface unit 10, whilst at least one accessory or device 20 of said circuit breaker is connected, once again via said first communication bus 5, to the second port 12 of said interface unit 10. In one of its preferred simpler embodiments, the accessory 20 is formed by an auxiliary-contact warning device for signalling the state of the circuit breaker. In this way, there is communicated to the protection unit 50 the state of the circuit breaker, which can be open, closed, or tripped.

More preferably, the protection unit 50 is connected, via a second communication bus 6, to a supervision system 2, external to the casing of the circuit breaker 1. In this way, the information corresponding to the state and to the conditions of the circuit breaker and the controls for the various accessories and actuators can be carried in a very simple way, inside and/or outside the circuit breaker, via the interface unit 10 and via the first communication bus 5 and the second communication bus 6, without having to resort to complicated and economically disadvantageous wiring and connection systems.

In the circuit breaker according to the invention it is in fact possible to manage, via the said first communication bus 5, also a plurality of accessories and devices. It is in fact possible, in the presence of a plurality of accessories and devices 20, 30, 40, to connect each of said accessories and devices to a corresponding port 12, 13, 14 using once again the first communication bus 5.

Advantageously, the interface unit 10 can be configured in such a way that each of the ports 11, 12, 13, 14, 15 may be used indifferently and in an interchangeable way by any one of said accessories and devices 20, 30, 40 and 50. In this way, it is possible to vary the number and/or the type of the various devices and accessories of the circuit breaker by simply connecting them to or disconnecting them from the interface unit 10 via the same communication bus 5. It is thus not necessary to add or remove wiring and connection systems, either in the initial installation stage or even in the event of change of the configuration of the circuit breaker.

The accessories and the devices that can be installed may be of various types. By way of example, it is possible to cite auxiliary-contact warning devices for signalling the state of the circuit breaker, actuators for opening, closing, or resetting, solenoid controls, motor controls, devices for loading springs, undervoltage relays, temperature sensors, displays, as well as other types of interface with the outside world.

Considering the multiplicity of the possible actuators and devices and the characteristics of the circuit breaker according to the invention, there emerge clearly the advantages that may be obtained with the present invention. For example, the information corresponding to the state of the circuit breaker determined through an auxiliary-contact warning device, for example 20, can be sent at the same time, via the first communication bus 5 and the interface unit 10, both to the protection device 50, and hence to the supervision system 2, and to a display, for example 30, connected to the port 13 of the dialogue unit 10. It is thus no longer necessary to use different communication buses, as instead occurs in the technical solutions known to the state of the art, thus simplifying considerably both construction and maintenance of the circuit breaker according to the invention.

To advantage, one or more of said accessories and devices, 20, 30, 40, 50, may be located inside the casing of the circuit breaker, obtaining in this way a highly integrated and compact system, with considerable advantages in terms of optimization and economy of the spaces of the system.

The interface unit 10, which represents the heart of the system, can to advantage execute a multiplicity of functions. As an alternative or in addition to the function of communication, the unit 10 can also perform functions of management and/or supply of said accessories and devices, with considerable saving and simplification deriving from the fact that any further wiring is avoided. For example, the supply can, to advantage, be drawn from the protection unit 50 and carried to one or more devices 20, 30, 40 according to the needs.

Advantageously, for instance in the case where one of said accessories and devices is formed by an actuator, for example 40, said actuator may also comprise an electronic transducer 41 for connection with said interface unit 10 and for actuation/supply of the actuator itself.

It is clear from the foregoing description that the low-voltage circuit breaker according to the invention presents considerable advantages as compared to the known art, also in terms of ease of management of the communication. In the circuit breaker according to the present invention, it is in fact possible to use a first communication protocol for said first communication bus and a second communication protocol for said second communication bus.

In practice, in one of its preferred and more simplified embodiments, the circuit breaker according to the invention comprises only two communication buses and two corresponding communication protocols, the first bus and corresponding protocol being dedicated to the communication between the various accessories and devices inside the circuit breaker, the second bus and corresponding protocol being dedicated to the communication between the circuit breaker and one or more external units, for example with the supervision unit 2.

It may in practice be noted how the circuit breaker according to the invention performs fully the primary task as well as the pre-established purposes, providing significant advantages as compared to the known art, both in terms of ease of construction and in terms of performance, as well as in terms of production costs.

The low-voltage circuit breaker thus devised may undergo numerous modifications and variations, all falling within in the sphere of the inventive idea. Furthermore, all the items composing it may be replaced by other technically equivalent elements. In practice, the materials, as well as the dimensions, may be any whatsoever according to the needs and the state of the art.

The invention claimed is:

1. A low voltage circuit breaker (1) comprising:
    a casing containing at least one fixed contact and at least one mobile contact, wherein said circuit breaker comprises, inside said casing,
    a first communication bus (5) designed to interface a plurality of accessory and devices (20, 30, 40, 50) of said circuit breaker (1), one of said devices and accessories being a protection unit (50), and
    an interface unit (10) comprising a plurality of ports (11, 12, 13, 14, 15) designed to be connected to said accessory and devices (20, 30, 40, 50) via said first communication bus (5),
    wherein said protection unit (50) is connected, via a second communication bus (6) to a supervision unit (2) outside the casing of said circuit breaker,
    wherein a first communication protocol is for said first communication bus (5), said first communication protocol being dedicated to the communication between the accessories and devices inside the circuit breaker, and
    wherein a second communication protocol is used for said second communication bus (6), said second protocol being dedicated to the communication between the circuit breaker and said supervision unit, and
    wherein said interface unit (10) is configured in such a way that each of said ports (11, 12, 13, 14, 15) can be used indifferently and in an interchangeable way by any one of said accessories and devices (20, 30, 40, 50).

2. The low-voltage circuit breaker (1) according to claim 1, characterized in that one of said devices and accessories is a protection unit (50) and in that said interface unit (10) comprises a first port (11) and at least one second port (12), the protection unit (50) being connected, via said first communication bus (5) to said first port (11), at least one accessory or device (20) of said circuit breaker being connected, via said first communication bus (5), to said second port (12).

3. The low-voltage circuit breaker (1) according to claim 2, characterized in that said accessory or device (20) is an auxiliary-contact warning device.

4. The low-voltage circuit breaker (1) according to claim 1, characterized in that it comprises a plurality of accessories and devices (20, 30, 40), each of said accessories and devices being connected, via said first communication bus (5), to a corresponding port (12, 13, 14) of said interface unit (10).

5. The low-voltage circuit breaker (1) according to claim 1, characterized in that each of said ports (11, 12, 13, 14, 15) can be used indifferently and in an interchangeable way by one of said accessories and devices (20, 30, 40, 50).

6. The low-voltage circuit breaker (1) according to claim 1, characterized in that said accessories and devices (20, 30, 40) are auxiliary contact warning devices and/or actuators for opening, closing, and resetting, and/or solenoid controls, and/or motor controls, and/or devices for loading springs, and/or undervoltage relays, and/or displays, and/or temperature sensors, and/or interfaces with the outside world.

7. The low-voltage circuit breaker (1) according to claim 1, characterized in that one or more of said accessories and devices (20, 30, 40) are located inside the casing of said circuit breaker.

8. The low-voltage circuit breaker (1) according to claim 1, characterized in that said interface unit (10) performs functions of communication and/or management and/or supply of said accessories and devices (20, 30, 40, 50).

9. The low-voltage circuit breaker (1) according to claim 8, characterized in that the supply is taken from said protection unit (50).

10. The low-voltage circuit breaker (1) according to claim 1 characterized in that at least one of said accessories and devices (20, 30, 40) comprises an electronic transducer (41) for connection with said interface unit (10) via the communication bus (5).

11. The low-voltage circuit breaker (1) according to claim 3, characterized in that said protection unit (50) is connected, via a second communication bus (6), to a supervision system (2) outside the casing of said circuit breaker.

* * * * *